United States Patent
Loukes et al.

[15] 3,658,504
[45] Apr. 25, 1972

[54] FLOAT GLASS MANUFACTURE APPARATUS

[72] Inventors: David Gordon Loukes, Prescot; Alan Edwards, Widnes, both of England

[73] Assignee: Pilkington Brothers Limited, Liverpool, England

[22] Filed: Mar. 13, 1969

[21] Appl. No.: 807,058

[30] Foreign Application Priority Data

Mar. 21, 1968   Great Britain........................13,789/68

[52] U.S. Cl. .........................................65/182, 65/65, 65/99, 204/68, 75/85 V
[51] Int. Cl. ......................................................C03b 18/00
[58] Field of Search ................65/27, 99, 182, 168; 204/68; 75/85

[56] References Cited

UNITED STATES PATENTS

| | | | |
|---|---|---|---|
| 3,330,635 | 7/1967 | Loukes et al. | 65/182 |
| 3,330,637 | 7/1967 | Loukes et al. | 65/182 |
| 3,480,420 | 11/1969 | Loukes et al. | 65/27 |
| 3,492,107 | 1/1970 | Simpson et al. | 65/182 |
| 3,467,508 | 9/1969 | Loukes et al. | 65/99 |

FOREIGN PATENTS OR APPLICATIONS 183,952   8/1966   U.S.S.R. ..................204/68

Primary Examiner—Frank W. Miga
Attorney—Morrison, Kennedy and Campbell

[57] ABSTRACT

In the float process for the manufacture of glass, an alkali metal is removed from the bath of molten metal by contacting the metal with a body of material which dissolves alkali metal oxide and connecting a D.C. source across the body to establish a field therein such that alkali metal ions are drawn into the body.

5 Claims, 3 Drawing Figures

Patented April 25, 1972 3,658,504
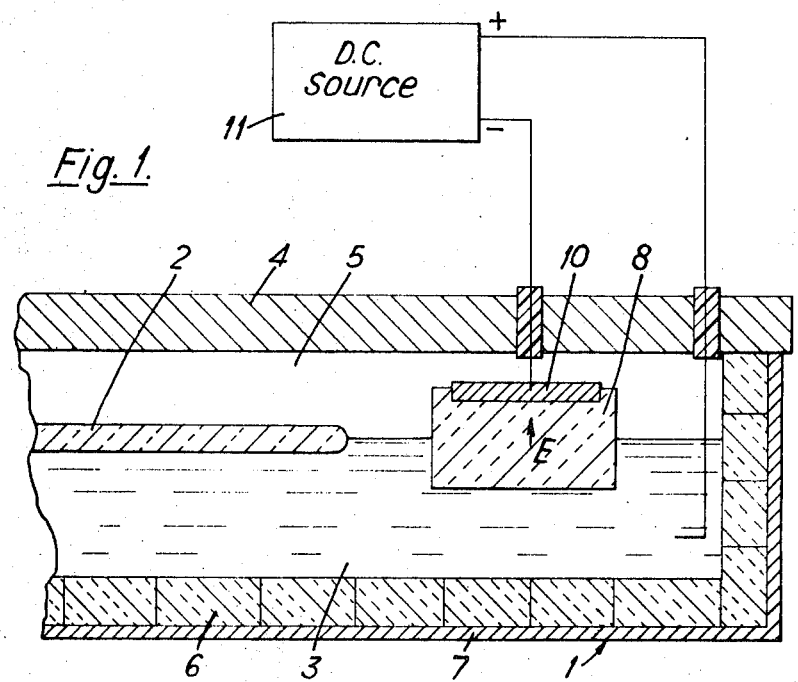
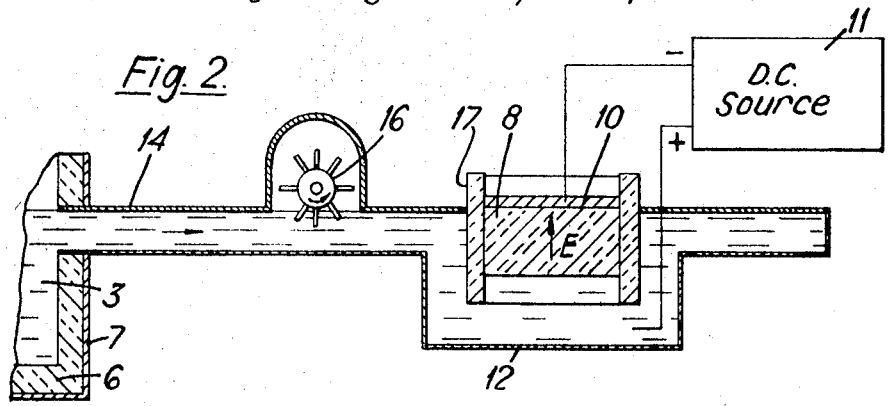
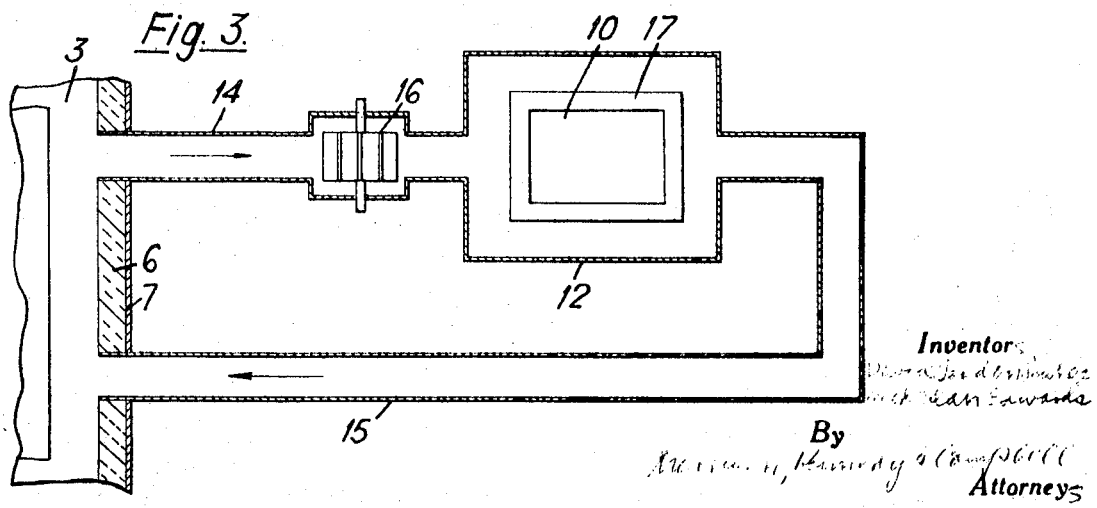

FLOAT GLASS MANUFACTURE APPARATUS

BACKGROUND OF THE INVENTION

This invention relates to the production of glass, and in particular to the float process and apparatus for the production of flat glass in which glass is supported on a bath of molten metal.

A molten metal bath for this purpose is preferably a bath of molten tin or a molten tin alloy having a specific gravity greater than that of the glass and in which tin predominates.

The bath of molten metal is usually contained in a tank structure having a refractory lining comprising, for example, refractory blocks held in an outer metal casing. It has been found that in use of such apparatus glassy accretions tend to form on the surfaces of the refractory lining in contact with the molten metal bath. If such accretions become detached from the bath lining they rise through the molten metal to the surface of the bath, where their presence can be detrimental to the quality of the glass formed on the bath, particularly in the hotter regions of the latter, where the temperature may be of the order of 1,000° C.

A main object of the present invention is to prevent or at least inhibit the formation of glass at the interfaces of the molten metal bath and the refractory lining of the tank structure which contains the bath.

SUMMARY

According to the invention, apparatus for use in the production of glass comprises a tank structure having a bath of molten metal upon which glass is supported, and means for removing an alkali metal form the bath comprising a body of material which dissolves an alkali metal oxide and which is in contact with the molten metal of the bath, and a direct current source connected across the body so that an electric field is established in the body, said field being directed away from the surface of the body which is in contact with the molten metal to cause alkali metal ions to be drawn into the body away from said surface.

Preferably electrical connections are made from the positive and negative terminals of the direct current source to the molten metal bath and to the upper surface of the body respectively. In this case the electrical connection to the body is preferably effected through a body of molten metal provided on the upper surface of the body.

In a preferred embodiment of the invention the said body comprises refractory material. For example the body may comprise part of a refractory lining of the tank structure which is immersed in the molten metal of the bath.

In one preferred embodiment of the invention the body is maintained in contact with a part of the upper surface of the molten metal bath which is not covered by the glass. In an alternative preferred embodiment means are provided for circulating the molten metal of the bath through a chamber communicating with the tank structure, the said body being disposed in said chamber in contact with said molten metal.

The invention also comprehends a method of producing glass in which the glass is supported on the upper surface of a molten metal bath, characterized by maintaining in contact with the molten metal of the bath a body of material which dissolves an alkali metal oxide from the bath, and establishing an electric field being established in the said body in a direction away from the surface thereof in contact with the said molten metal so as to cause alkali metal ions to be drawn into the body away from said surface, whereby the alkali metal content of the bath is reduced.

The invention further comprehends glass produced by the method hereinbefore described.

BRIEF DESCRIPTION OF THE DRAWINGS

FIG. 1 is a partial diagrammatic cross section of a glass treatment tank incorporating one embodiment of the invention, and FIG. 2 is a diagrammatic sectional elevation of part of an apparatus in accordance with another embodiment of the invention, and FIG. 3 is a plan view of the apparatus of FIG. 2.

DESCRIPTION OF THE PREFERRED EMBODIMENT

FIG. 1 is a diagrammatic transverse cross section of a tank structure 1 in which glass in the form of a continuous ribbon 2 is manufactured and/or treated. The tank structure 1 is elongated in a direction perpendicular to the plans of FIG. 1 and contains a bath of molten metal 3, usually tin or a tin alloy, upon which the glass ribbon 2 floats. The glass is supplied to the surface of the bath 3 at one end of the tank in a molten state from a glass melting tank through a regulating tweel (not shown) and the ribbon of glass 2 which forms on the bath 3 is advanced along the tank, the temperature of the glass being controlled by means of suitable heaters (not shown) in and above the bath 3 so that at the other end of the bath the ribbon 2 has hardened sufficiently to be withdrawn from the surface of the bath 3. Typically the temperature of the glass ribbon 2 at the inlet end of the bath 3 is of the order of 1,000° C, while at its removal from the bath the ribbon temperature may be of the order of 600° C.

The bath 3 is enclosed by a roof structure 4 which defines a plenum chamber 5 over the glass ribbon 2. An inert gaseous atmosphere, for example, of nitrogen, is maintained in the plenum chamber 5 to prevent oxidation of the exposed surfaces of the molten metal bath 3.

The tank structure 1 has a refractory lining constituted by refractory blocks 6 defining the walls and base of the tank and enclosed in a metal casing 7.

In operation of the apparatus, an alkali metal, for example, sodium, supposedly in the form of soda (sodium oxide, $Na_2O$), in the glass ribbon 2 undergoes a cation exchange reaction with stannous oxide in the bath 3, resulting in a proportion of soda entering the bath 3. There is a tendency, which is more acute at the hot inlet end of the bath, for the soda thus present in the molten metal bath 3 to form a glaze on the surface of the refractory lining blocks 6. Such glazing of the refractory lining has been found to lead to two undesirable effects on the glass ribbon 2 being formed:

i. The glazing of the refractory lining renders the lining impervious to gases, such as hydrogen which come out of solution in the tin of the bath 3. Consequently such gases form bubbles which rise through the bath 3 to form open-bottomed bubbles on the lower face of the glass ribbon 2.

ii. Glassy accretions forming the glaze on the refractory lining from time to time break away from the lining, whereupon they rise through the bath 3 and adhere to the lower face of the ribbon 2. The adhering glaze results in a defect resembling a tadpole in appearance, the "tail" of the tadpole frequently being several feet along.

A glaze also tends to arise on the refractory tank lining when effecting a surface treatment of a glass ribbon on a molten metal bath, particularly by electrolytic treatment, where an electric current is passed through the glass and through the supporting molten metal bath. Sodium metal will be present in the bath as a result of the electrolytic action on the glass, and this sodium has a deoxidant effect on stannous oxide in the bath, which effect may be represented by:

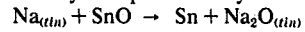

$$Na_{(tin)} + SnO \rightarrow Sn + Na_2O_{(tin)}$$

The resulting soda ($Na_2O$) in the bath produces glazing of the refractory lining of the bath as hereinbefore described.

The present invention prevents or inhibits the formation of glaze on the refractory tank lining by removing soda or sodium metal from the molten metal bath.

FIG. 1 illustrates one method of carrying out the invention, the cross-section of the tank structure 1 being taken near the inlet end of the bath, where the temperature is about 950° C. It will be seen that the glass ribbon 2 does not occupy the entire width of the bath surface. A floating body of refractory material 8 lies on part of the uncovered surface of the bath 3 alongside the ribbon 2. The refractory body 8 comprises an elongated block extending parallel to the adjacent edge of the ribbon 2 and typically up to 1 inch in thickness. A suitable refractory material for the body 8 is silica ($SiO_2$).

A recess 9 is formed in the upper surface of the body 8 and a pool of molten conductive material 10, conveniently tin, is contained in the recess 9. A direct current source 11 has a negative terminal connected to the pool 10 and a positive terminal connected to the molten metal bath 3, so that an electric field E is established in the refractory body 8, directed away from the surfaces thereof contacting the bath. Typically the source 11 supplies 20 amps. at 100 volts and the surface area of the body 8 contacting the bath 3 is 20 square feet, so that a current density of 1 amp per square foot passes through the body 8.

Soda from the tin in the bath 3 dissolves at the surface of the refractory body 8. Under the influence of the applied field E, sodium ions are drawn into the body 8, oxygen being released at the surface of the bath 3, where it forms stannous oxide with the tin of the bath. The sodium ions are neutralized at the pool 10, where sodium metal is released.

The effect of the continuous removal of sodium ions through the body 8 is to maintain the lower surface of the body 8, in contact with the bath 3, free of soda, thereby promoting the continuous withdrawal and dissolution of further soda from the bath 3.

The sodium metal released into the molten tin pool 10 either volatizes directly at the temperature of the body 8 (950° C), the boiling point of sodium being 880° C, or is oxidized to $Na_2O$ by residual oxygen in the plenum chamber 5; such $Na_2O$ either vaporizes or dissolves in the upper surface of the body 8. A vent (not shown) for the removal of sodium or soda ($Na_2O$) vapor is conveniently provided.

The molten tin pool 10 can if desired be changed periodically. It is however, preferred to permit vaporization of sodium and soda as described above while allowing the upper surface of the refractory block 8 itself to become glazed by dissolving soda. In operation, therefore, glaze is formed in the body 8 and "eats" its way downwardly through the body 8 from the upper surface.

The movement of soda molecules through the molten tin bath to the "purification zone" occupied by the refractory body 8 is determined by the natural flow of tin in the bath 3. By using an electro-chemical system of the kind shown which is separate from the glass ribbon 2 and any electrolytic treatment applied thereto, a high current efficiency for the removal of soda from the bath is obtained. The reason for this is that the surface of the refractory body 8 in contact with the bath 3 rapidly becomes highly polarized with respect to tin ions ($Sn^{++}$), so that the major contribution to the current flow through the body 8 is due to the removal of soda from the bath.

In the course of time the refractory body 8 acquires so much soda ($Na_2O$) that it softens to the extent that the sodium-rich pool 10 starts to sink through the body 8. An indication of the soda content of the body 8 can be obtained by monitoring the electrical conductivity of the block, which will increase as the soda content increases. The expected operational lifetime of a body 8 having a thickness of 1 inch is at least 6 months.

Another example of a suitable refractory material for the body 8 is that commonly used to form the tank lining refractory blocks 6. This material has the advantage of having a higher electrical conductivity than silica, although the latter has a greater capacity for absorbing soda. In any event the refractory body 8 should be capable of dissolving soda, that is, it should have a high silica rather than a high alumina content.

When the invention is applied to an apparatus for effecting surface treatment (e.g. tinting) of glass, the body 8 is effective in removing sodium metal from the bath 3, resulting from electrolytic migration into the tin of the bath. In this case the sodium metal forms sodium ions which are removed from the surface of the bath by the electric field E applied to the body 8, even if the sodium metal has not been oxidized in the bath to soda ($Na_2O$). It is not then necessary to use a refractory material for the body 8 which dissolves soda. For the removal of sodium metal, therefore, a refractory body 8 having a high alumina content could in principle be used.

The embodiment of FIG. 1 is illustrated in its application to the hot inlet end of the molten metal bath. It will be appreciated, however, that this embodiment is equally applicable to the cooler outlet end of the bath, where the temperature may be of the order of 750° C. In view of the lower temperature in this region the body 8 in this case need not be of refractory material but could, for example, be of glass.

The invention can also be applied to the lining blocks 6 of the tank directly. A direct current source is connected across the internal and external surfaces of the lining to produce an electric field in the lining directed from the interior towards the exterior of the lining, in which case the previously described mechanisms would operate to remove an alkali metal oxide, for example, soda, from the interior surfaces of the lining. Glaze would then begin to form on the external, rather than the internal, surfaces of the lining, and the drawbacks associated with the formation of glaze on the interior of a lining would again be obviated.

Where refractory lining blocks 6 are employed molten metal from the bath 3 may penetrate the cracks in and between the blocks 6 and tend to provide short-circuit paths between the internal and external faces of the blocks 6. This is obviated by connecting the negative terminal of the direct current source to an electrode inserted in a pocket drilled in the external face of a block 6.

An alternative embodiment of the invention is illustrated diagrammatically in FIGS. 2 and 3, where the same reference numerals indicate like parts. In this embodiment the molten metal (tin) from the bath 3 is circulated through a chamber 12 communicating with the interior of the tank structure 1 through an inlet 14 and an outlet 15. Circulation of the metal through the chamber 12 is effected by a rotary paddle-wheel pump 16 in the inlet 14.

The body 8 is disposed in the chamber 12 and has a lower flat surface in contact with the molten metal in the chamber. A pool 10 of molten tin on the upper surface of the body 8 forms an effective cathode, and as in the embodiment of FIG. 1 an electric field E is established in the body 8 away from the surface in contact with the molten metal by connecting the metal in the chamber 12 and the pool 10 to the positive and negative terminals respectively of a direct current source 11.

In this embodiment the body 8 comprises glass or a refractory at a temperature between 700° C and 1,000° C depending on the location of the chamber 12 along the bath. The body 8 of glass is contained laterally by an annular refractory wall 17.

A plurality of chambers 12 of the kind shown in FIGS. 2 and 3 may be provided, the inlets and outlets of the chambers communicating with the tank structure 1 at respective locations spaced apart along the length of the tank structure.

The rate of operation of the pump or pumps 16 is adjusted so that the quantity of soda in the metal drawn into the chamber 12 in a given time is equal to the quantity resulting from the glass ribbon 2 in that time. Since currents of up to 100 amps at 100 volts are practicable, the need for a large interfacial area between the body 8 and the molten metal (tin) is avoided. Moreover the passage of a high current of this order through the body 8 heats the body and assists in maintaining it at the required temperature.

We claim:

1. Apparatus for use at a temperature in the range of about 600° C to 1,000° C in the production of float glass comprising a tank structure containing a float glass supporting bath of molten metal selected from the group consisting of molten tin and molten tin alloys in which tin predominates, a solid body of siliceous material separate from said float glass, said body of siliceous material having a face in contact with said molten metal bath and said body of siliceous material containing silica in an amount sufficiently high to dissolve alkali metal ions from the bath, and a direct current source connected to the bath and to a face of the body not contacting the bath, the sense of the connection being such that the molten metal bath is anodic thereby causing alkali metal ions to be drawn into the siliceous body from the interface between the molten bath and the body.

2. Apparatus according to claim 1, wherein the negative terminal of the source is connected to a pool of molten metal on the upper surface of the siliceous body.

3. Apparatus according to claim 1, wherein the said body is a block of silica-rich refractory material.

4. Apparatus according to claim 1, wherein the said body is maintained in contact with a part of the upper surface of the molten metal bath which is not covered by the glass.

5. Apparatus according to claim 1, including means for circulating the molten metal of the bath through a chamber communicating with the tank structure, the said body being disposed in said chamber in contact with said molten metal.

* * * * *